Nov. 21, 1944.  L. L. VAYDA ET AL  2,363,027

GAS ANALYZER

Filed Nov. 6, 1939  2 Sheets-Sheet 1

INVENTOR
Louis L. Vayda and
BY Joseph A. Stein
Joseph E. Dickinson
ATTORNEY

Nov. 21, 1944.   L. L. VAYDA ET AL   2,363,027
GAS ANALYZER
Filed Nov. 6, 1939   2 Sheets-Sheet 2
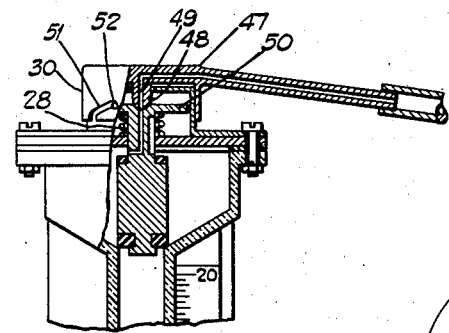
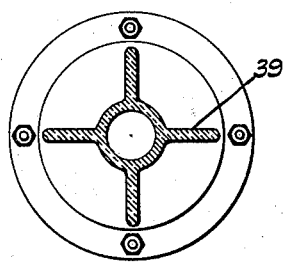
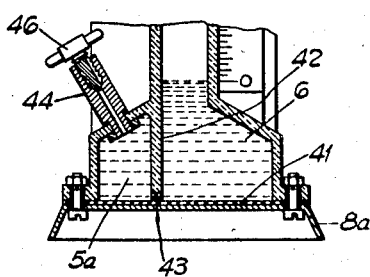
INVENTOR
Louis L. Vayda and
Joseph A. Stein
BY
Joseph E. Dickinson
ATTORNEY Patented Nov. 21, 1944

2,363,027

UNITED STATES PATENT OFFICE 2,363,027

GAS ANALYZER

Louis L. Vayda and Joseph A. Stein, Pittsburgh, Pa.

Application November 6, 1939, Serial No. 302,971

8 Claims. (Cl. 23—254)

This invention relates to an improvement in gas analyzers or indicators of the volumetric measurement or absorption type which employ in their operation what is commonly known as the "Orsat method" of analyzing gases.

Gas analyzers of this type have been available for many years in one form or another, and are employed both experimentally and commercially for determining the percentage of gases in different atmospheres. In their operation the atmosphere to be analyzed is captivated in a measured amount and then mixed with some suitable absorbent by which a selected gas therein is removed and its volume measured by measuring the extent to which the volume of the atmosphere is thereby reduced due to the gas absorbed by the absorbent.

Analyzers or indicators of this kind are particularly well suited for analyzing flue gases and the like, and while not necessarily so limited in its use, this invention, as will be obvious from the following description, has been more particularly developed for this latter purpose.

A primary object of the invention is to provide an analyzer for such purpose which is extremely compact in construction, simple and easy to operate, and at the same time capable of highly dependable and accurate operation.

A further object is to provide an analyzer which is not easily broken nor readily disturbed in operation due to handling, and which can be easily reconditioned as well as adjusted for analyzing various gases.

It is also an object of this invention to provide an analyzer in which the absorbent medium employed is also used as a means for indicating the percentage of the gas mixture tested which is represented by the gas removed by the absorbent.

Figure 3:
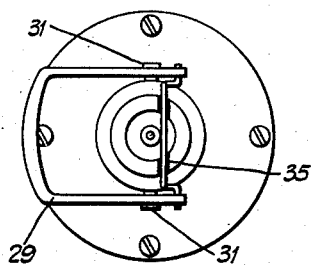
Figure 4:
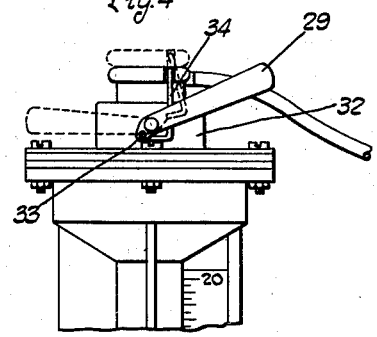
Figure 2:
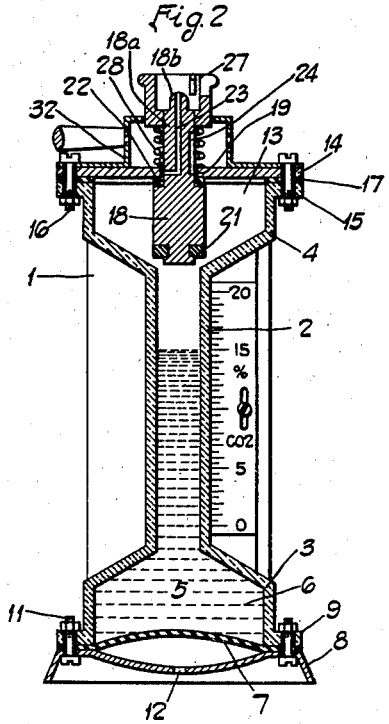
Figure 1:
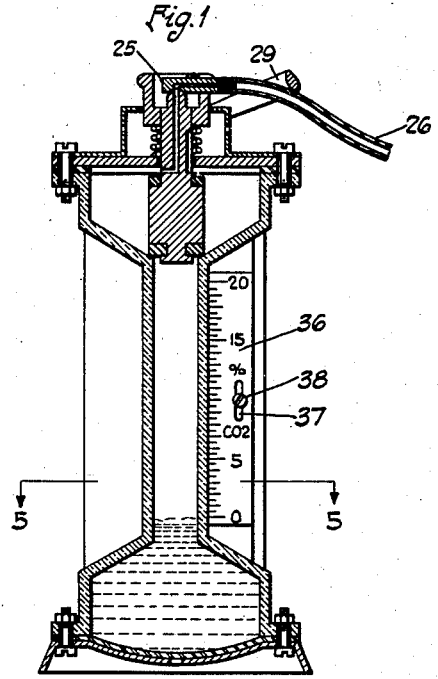

These and various other objects, as well as the various other novel features and advantages of the invention, will be apparent from the following detailed description when read in conjunction with the accompanying drawings, of which Figures 1 and 2 are sectional views taken vertically to an analyzer constructed in accordance with the invention and showing it adjusted respectively so as to receive a gas to be analyzed and for analyzing a gas captivated in it. Figures 3 and 4 are top and elevational views respectively of the upper end of the same embodiment showing the operating lever in its alternative position. Figure 5 is a transverse section taken on the line 5—5 of Figure 1, and Figure 6 is an interrupted view similar to Figure 1 showing a modified form of the invention.

Referring in detail to these drawings and first to Figures 1 to 4, the analyzer therein illustrated comprises a body 1 which is made of transparent material and preferably some non-fragile substance. As shown this body is made up of a central restricted tubular section 2 and two flared end sections 3 and 4.

The lower flared end section 3 is provided to form a reservoir 5 wherein the absorbent liquid 6 used in the analyzer is stored. The bottom of this section is closed off by a flexible diaphragm 7 which is held in place by a rigid cover 8 secured to a flange 9 on the lower edge of the flare 3 by means of suitable bolts 11. This cover which clamps the edge of the diaphragm against the body 1 is adapted to also function as a base for the unit and has a depression in its central portion in which the diaphragm 7 normally rests. It is in addition provided with an opening 12 by means of which the exterior surface of the diaphragm is exposed to the atmosphere for a purpose to be presently described.

The upper flared section 4 of the body 1 is provided to form a reservoir or chamber 13 in which a measured volume of gas to be tested may be captivated. The upper wall of this chamber is formed by a cover 14 which is secured by means of bolts 16 to an outwardly extending flange 15 on the upper edge of the section 4, a gasket 17 being located between this cover and the flange to render the mounting gas tight. Within the reservoir 13 an elongate double acting valve 18 is located which is equipped with an actuating stem 18a that projects through an opening 19 provided therefor in the cover plate 14.

The lower end of this valve is provided with a gasket 21 which is adapted to seat against the lower end of the chamber 13 when the valve is in its lower position and thereby prevent access of the atmosphere to be tested entering the tubular section 2. The other end of the valve is equipped with a similar gasket 22 which seats against the cover 14 when the valve is in its upper position and thereby completely closes the interior of the analyzer against the escape of any gas or absorbent which may be in it.

To charge the chamber 13 with a gas to be tested a duct 23 is formed in the valve stem 18 being extended through the center thereof from its upper end to a point adjacent the top of the upper valve seat 22 where it communicates with the side of the stem. Hence when the valve 18 is in its lower position the duct 23 communicates with the chamber 13 and when in its upper position it is shut off from the interior of the analyzer.

The stem is also provided with a groove 24 along one side which extends from a point spaced upwardly from the cover 14 to a point adjacent the upper edge of the upper valve seat 22. Hence like the duct 23 it communicates with the chamber 13 when the valve is in its lower position and is shut off from such chamber when the valve is in its upper position. The purpose of this groove is to permit the air or atmosphere in the chamber 13 to escape when it is being charged with a gas to be tested, and to so function the groove is disposed diametrically opposite the lower opening of the duct 23 in the valve stem.

To charge the analyzer with a gas or atmosphere to be tested any suitable means may be employed for pumping the gas from a flue or other source of supply through the valve stem 18a. To facilitate this in this embodiment the upper end 18b of the stem 18a is rounded to receive a fitting 25 which may be mounted on a flexible conduit 26 leading from the pump or injector used which is not shown as it comprises no part of the invention.

To facilitate the operation of the analyzer it is preferable to maintain the upper valve seat 22 normally in its closed position and to be able to quickly snap the valve from its lower to its upper position when a charge of gas is injected into the chamber 13 so that none of the gas will escape when the valve is being shifted and to minimize absorption of $CO_2$ by film of absorbing fluid while sample is in the act of being trapped. Toward this end a fitting 27 is secured to the top of the stem 18 and between its lower end and the top of the cover 14 there is fitted a relatively strong coil spring 28, such spring being able not only to normally hold the valve in its upper stated position, but to quickly snap it from its lower to its upper position when the pressure on the stem holding the valve in its lower position is released.

For actuating the valve 18 to its lower position and holding it there a lever 29 is employed. This lever is a substantially U-shaped member which has its two extremities pivotally mounted on a pair of trunnions 31 carried by a dome-shaped cover 32 that fits over the top of the analyzer and is held in place by the same bolts 16 that hold the coverplate 14 in place. As shown the ends of this lever project slightly beyond the trunnions 31 and in this projecting portion holes 33 are provided in which the ends of a clamping element 34 are engaged. This element which is also made somewhat in the shape of the letter U extends over the top of the fitting 27 on the upper end of the valve stem and engages in a groove 35 provided therein for its reception. This groove, as will be noted, is offset when the lever 29 is in the position shown in Fig. 4 from the center of the valve stem and on the side opposite that of the projecting ends of the lever 29 in which the ends of the clamping element 34 is engaged. With this arrangement when the lever 29 is moved to the position shown in Figures 1 and 3, it causes the clamp 34 to carry the valve stem 18a with it and thereby force the valve 18 against the action of the spring 28 onto its lower seat. Furthermore, due to the mounting and arrangement of the clamping element 34 when the lever 29 passes a certain point on its downward stroke the spring 28 is unable due to the over center eccentricity of the clamping element to lift the valve. On the other hand, when the lever is raised as it passes this point the spring quickly snaps the valve and lever to the upper position and the over center point is so located that the spring becomes active at the time the lower valve seat starts to break. Thus a quick action is imparted to the valve to seal the chamber before absorption takes place by film adhering to the walls and to avoid gas escaping from the chamber 13 or air creeping into it when the valve is operated.

In the operation of the analyzer a suitable absorbent liquid 6 is first placed in the body 1 and in a sufficient quantity to maintain its upper surface, with the diaphragm 7 in its lower position at a point slightly upwardly of the lower end of the central tube section 2. The top covers of the unit are then fitted in place and the pump fitting 25 connected to the top of the valve stem 18b beneath the clamp 34. Next the lever 29 is actuated to its lower position as shown in Fig. 4, placing the valve 18 in its lower seat, shutting the chamber 13 off from the tube 2 and connecting the duct 23 with the gas chamber and the groove 24 with the chamber. The atmosphere to be tested is then pumped into the gas chamber and this pumping action continued until the gas completely forces the air out of such chamber by way of the groove 24 and fully fills the chamber. The lever 29 is then lifted either by raising the conduit 26 to detach it or by lifting directly on the lever. As explained, when the lever passes a certain point the valve 18 is snapped to its upper position.

With the movement of the valve 18 off its lower seat, the atmosphere in the gas chamber is placed in communication with the tube 2 and exposed to the absorbent 6. To accelerate the action of the absorbent the analyzer may now be inverted and shaken to thoroughly mix the gas and the absorbent. As the gas or element to be determined is absorbed by the absorbent, the reduction in gas volume tends to produce a negative pressure or pressure below atmospheric in the analyzer. As this develops due to the diaphragm being exposed at its outer side to atmospheric pressure, the diaphragm flexes inwardly till a pressure balance is reached. Consequently when the analyzer is placed in its normal up-right position and the liquid settles back into the liquid chamber 5, the liquid is caused to raise in the tube 2 an amount which is essentially equal in volume to the volume by which the gas has been reduced by the absorption taking place. Consequently the height of the absorbent in the tube is indicative of the amount of gas removed by the absorbent.

In order to take advantage of this to measure the percentage of gas removed, the tube may be calibrated accordingly with the absorbent being used as the indicating medium. In the present embodiment a calibrated strip 36 is attached to the tube section with its zero reading disposed opposite the normal level of the absorbent at the base of the tube 2 and its index figures in terms of percentages, whereby direct percentage readings are obtained. To facilitate registering the zero reading with the meniscus of the absorbent the strip 35 may be provided with a slot 37 at the point where it is secured to the body 1 by means of a screw 38 so that it can be readily raised and lowered a limited amount to register the zero mark with the meniscus of the absorbent.

As a further feature of the construction a plurality of vertically disposed radially extending strengthening and spacing members or ribs 39 are formed on the tubular section 2 and extended between the two flared sections 2 and 3. These ribs have two principal purposes. One is to increase the strength of the unit aaginst breakage and the other is to keep the operator's hand spaced from the tube and insulate the unit against the influence of the body temperature of the user. One of the ribs also is used as a support for the calibrated strip 36 and hence permits the strip to be conveniently exposed for reading.

As will be obvious, the unit can be reset for repeated use merely by operating the valve 18 and displacing the tested gas and can be adjusted to test different gases merely by replacing the absorbents as my be required.

Referring to the embodiment of the invention illustrated in Figure 6, certain modifications are shown, but the same reference characters applied thereto where similar parts to those shown in Figures 1 to 5 are used. The only essential differences between this unit and the one first described is in the way the valve operating and gas feed assembly is made and the way the pressure balance on the absorbent liquid is obtained.

In this embodiment in place of having the bottom of the unit formed by a flexible diaphragm, the cover 8a is used for this purpose, being made gas tight by means of a gasket 41. To expose the absorbent 6 on one side to the effect of atmospheric pressure, a baffle 42 is extended across one sector of the flared section 2 and the chamber so formed connected to the liquid chamber 5 by means of an orifice 43. This allows the liquid to enter both the chambers 5 and 5a and to prevent the liquid escaping when the unit is shaken and at the same time provide for subjecting it to atmospheric pressure, a valve assembly 44 is secured to the flared section 2 over the chamber 5a, being made up of a housing 44 and a screw valve 46. When the gas is absorbed by the liquid, this screw valve is opened to permit the absorbent liquid to seek its proper level caused by the pressure operating upon it both within and without the analyzer. In this respect the operation of the indicating means is the same in this as in the other embodiment. The screw valve can also be used to change the absorbent if desired.

The upper assembly of this analyzer uses a screw type cap 47 for operating the valve 18 instead of the lever 29. The operation of the valve, however, is substantially the same, although the lever actuating cap also functions as a fitting for connecting the flexible conduit 26 of the gas feeder to the analyzer. A nipple 48 communicating with a duct 49 is formed inside the cap to fit in a receiving depression in the valve stem 18a and in place of a fitting 27 on the end of this stem, the latter is provided with an integral flange 50 against which the spring 28 bears. To hold the cap in place it is provided with spaced notches 51 in which trunnions 52 on the cover 30 engage. These notches 51 are so shaped that when the cap is turned a limited amount, the spring 28 operates to throw off the cap and snap the valve to its upper position.

To reiterate, the operation of both these embodiments of the invention is essentially the same in principle and if desired, either of the modifications shown in Figure 6 could be exchanged for the corresponding parts of the embodiment illustrated in Figures 1 to 5.

As will also be obvious to those skilled in the art, the inventions hereof may be carried out in various other ways, although in accordance with the embodiments illustrated all of the aforementioned objectives of the invention are accomplished.

According to the provisions of the patent statutes, we have explained the principle and mode of operation of our invention and have illustrated and described what we now consider to be certain recommended embodiments. However, we desire to have it understood that, within the scope of these appended claims, the invention may be practiced otherwise than as specifically illustrated and described.

We claim:

1. A gas analyzer comprising a gas chamber, an absorbent reservoir, a vertically disposed transparent tube communicating at its lower end with said absorbent reservoir and at the upper end with said gas chamber, means for admitting a measured amount of gas to said gas chamber and trapping said gas in said chamber and transparent tube, an absorbent liquid in said absorbent reservoir, a yieldable wall in said absorbent reservoir which supports said absorbent liquid and is exposed to the atmosphere thereby permitting said absorbent to be drawn into said transparent tube by the vacuum created when said gas is absorbed by the absorbent, and a calibrated scale associated with the transparent tube for indicating by the level of the absorbent in said tube the percentage of gas absorbed by the absorbent.

2. A gas analyzer according to claim 1 in which said gas-admitting means comprises a double acting unitary two-way valve which is operative in one position to admit gas to the gas chamber while preventing it from entering the tube and in the other position for trapping it in the analyzer in such a way that it can be readily mixed with the absorbent.

3. A gas analyzer according to claim 1 which is provided with reinforcing and spacing members extending lengthwise of the tube and projecting laterally therefrom to enhance the strength thereof and also protect the analyzer against the influence of heat from the hand of a user when it is being handled.

4. A gas analyzer according to claim 1 in which said gas-admitting means comprises a double acting two-faced valve in the gas chamber by means of which gas is admitted when the valve is in one position to the gas chamber and trapped in the analyzer when said valve is in its alternate position.

5. A gas analyzer comprising a body consisting of a central transparent tube, a reservoir for absorbent liquid at the lower end of said tube, a flexible diaphragm forming the bottom of said reservoir, a rigid cover having an opening in it secured to said reservoir to hold said diaphragm in place and form a base for the analyzer, a second reservoir at the upper end of said tube, a cover over said latter reservoir which has an opening in it to receive a valve stem, a valve located in said chamber with an operating stem slidably projecting through said opening, means at the lower end of said valve for closing off the upper end of the tube when the valve is in its lower position and means at the upper end for closing off the opening in said upper cover when the valve is in its upper position, a spring disposed to normally bias said valve toward its upper position, means for connecting a gas conductor to said valve stem, a duct in said stem extending from a point adjacent the upper end of said valve to the upper end of the stem for connecting said gas conductor with the second reservoir, a groove above said valve in one side of said stem terminating at one end adjacent the upper end of said valve and at the other at a point above the cover of the second reservoir to afford communication between the second reservoir and the atmosphere when the valve is in the lower position, means for moving said valve against the pressure of said spring to its lower position, and a calibrated scale associated with said transparent tube for indicating by the level of the absorbent in the tube the percentage of gas absorbed by the absorbent.

6. A gas analyzer according to claim 5 having a lever pivotally mounted thereon, and means connected to said lever for utilizing the lever to move the valve to its lower position against the pressure of the spring biasing it to its upper position.

7. A gas analyzer according to claim 5 in which the means for moving the valve against the pressure of the spring acting against the valve comprises a bifurcated lever which is pivotally secured adjacent the ends of the arms thereof to the cover of the upper reservoir, and a clamping element disposed to engage the upper end of said valve stem connected to said lever at a point so spaced from the point where the lever is pivotally secured to the upper reservoir that the lever automatically holds the valve in its lower position against the pressure of the valve spring when the lever is in its lowermost position, and permits the valve spring to snap the valve to its upper position when the lever is raised a limited distance upward from its lowermost position.

8. A gas analyzer comprising an absorbent receiving reservoir at the base of the analyzer, a gas-receiving chamber at the top of the analyzer, a vertically disposed calibrated transparent tube communicating at its upper end with said gas chamber and at its lower end with said reservoir and constituting the measuring element of the analyzer, valve means for admitting and discharging gas to and from said gas chamber and tube, an absorbent liquid in said absorbent-receiving reservoir, and a flexible diaphragm at the bottom of said absorbent reservoir for supporting the absorbent and which is exposed on one side to the atmosphere to thereby permit the absorbent liquid to be drawn into said calibrated tube.

LOUIS L. VAYDA.
JOSEPH A. STEIN.